May 9, 1950          W. A. HELSTEN          2,507,015

BRAKE HEAD ARRANGEMENT

Filed Oct. 18, 1945          2 Sheets-Sheet 1

INVENTOR.

Wesley A. Helsten

BY

Atty.

May 9, 1950 W. A. HELSTEN 2,507,015
BRAKE HEAD ARRANGEMENT
Filed Oct. 18, 1945 2 Sheets-Sheet 2

INVENTOR.
Wesley A. Helsten,
BY
Orin O.B. Garner
Atty.

Patented May 9, 1950

2,507,015

UNITED STATES PATENT OFFICE 2,507,015

BRAKEHEAD ARRANGEMENT

Wesley A. Helsten, Chicago, Ill., assignor to American Steel Foundries, Chicago, Ill., a corporation of New Jersey Application October 18, 1945, Serial No. 622,977

8 Claims. (Cl. 287—93)

My invention relates to brake rigging and more particularly to a brake head balancing device comprising friction means for yieldably maintaining a brake head on an associated supporting member.

The general object of my invention is to devise a brake head balancing device wherein the brake head member is pivotally mounted on its supporting member in frictional engagement therewith, the balancing device including resilient means for urging said members into said engagement.

Another object of my invention is to provide a balancing device of the above-described type wherein the device is maintained in assembled relationship by novel retaining means mounted on the supporting member and comprising relatively few parts of simple design to facilitate the application and removal of the head and its associated parts with respect to the supporting member.

A further object of my invention is to provide novel means for limiting relative pivotal movement of the head and its supporting member within limits permitting brake application of the head to an associated wheel in the event the resilient means fails to function.

With these and various other objects in view, the invention may consist of certain novel features of construction and operation as will be more fully described and particularly pointed out in the specification, drawings and claims appended hereto.

Figure 1:
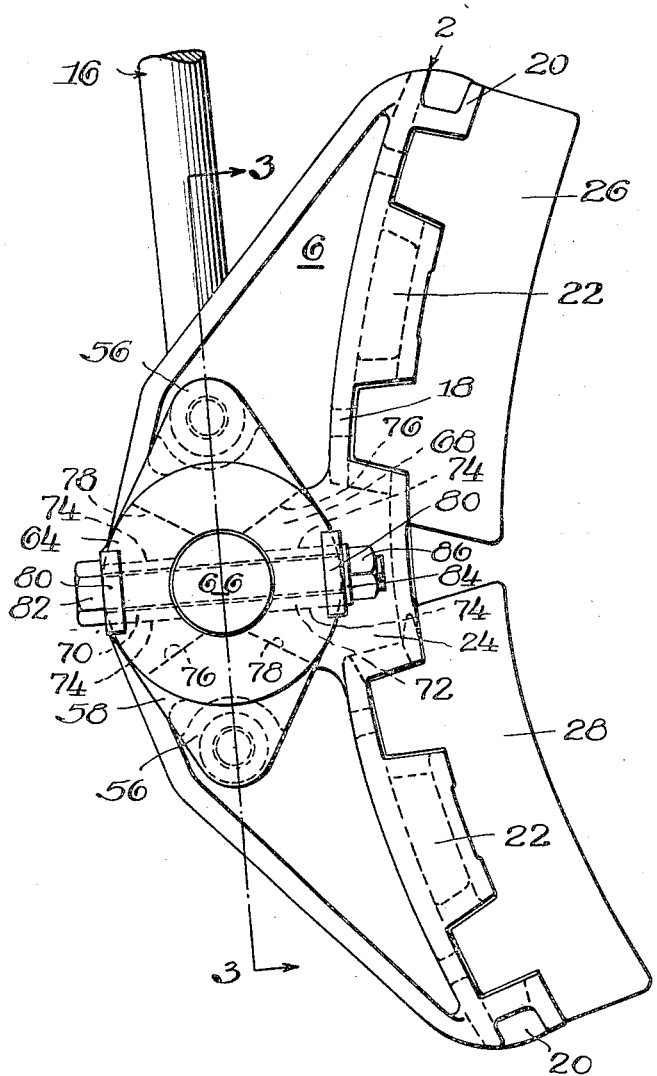
Figure 1 is a side elevation of my novel brake head arrangement, only a fragmentary portion of the supporting hanger and brake beam being shown.
Figure 2:
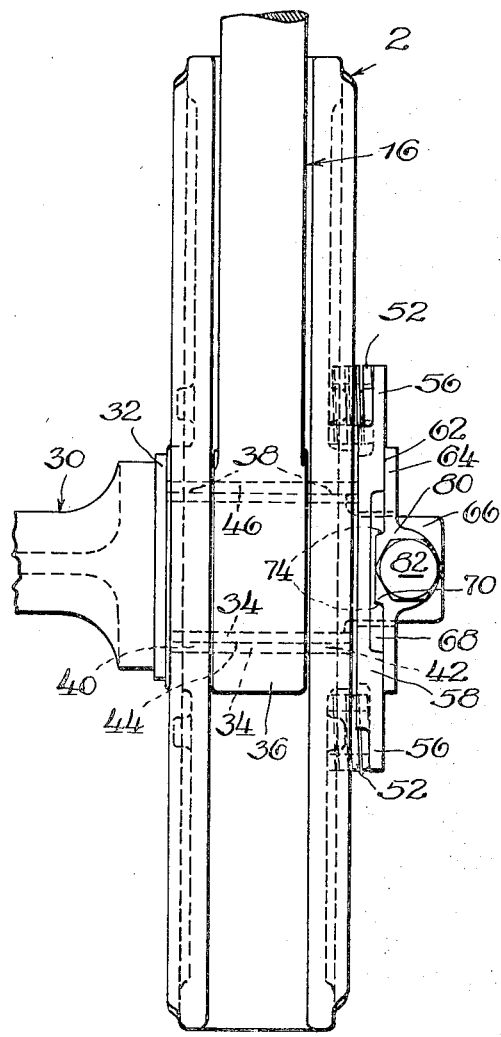
Figure 2 is a rear view of the structure shown in Figure 1.
Figure 3:
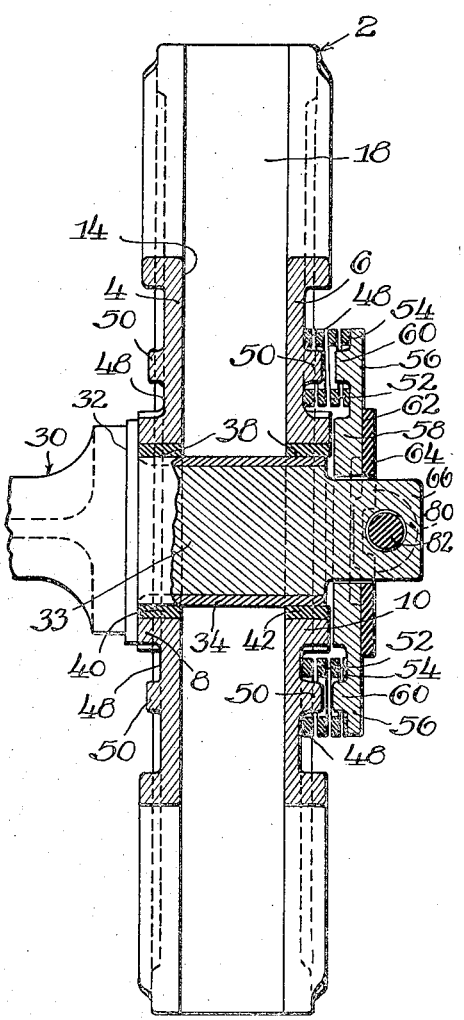
Figure 3 is a sectional view thereof, taken approximately in the plane of the hanger and as indicated by the line 3—3 of Figure 1, the hanger being omitted in this view.

My novel arrangement comprises a brake head, generally designated 2, and comprising the spaced inboard and outboard walls 4 and 6 providing parallel bearing portions 8 and 10, respectively, said walls defining the usual hanger slot or opening 14 within which may be received the hanger, generally designated 16. The walls 4 and 6 are connected by a transverse wall 18 extending therebetween and merging with spaced end lugs 20, 20, intermediate lugs 22, 22, and the central lug 24 providing support in usual manner through the medium of a key or keys (not shown) for the upper and lower brake shoes 26 and 28.

The brake beam, generally designated 30, is shown with the end thereof formed with a shoulder or collar 32 beyond which is a journal portion or trunnion 33 to which may be tightly fitted a bushing 34. The trunnion 33 extends through aligned openings in the brake head bearing portions 8 and 10 and the hanger bearing portion 36 with the bushing 34 of said trunnion in bearing engagement as at 38 with bushings 40 and 42 fitted, respectively, in the bearing portions 8 and 10 of the brake head and as at 44 with the bushing 46 of the hanger bearing portion 36.

At opposite sides of each of the bearing portions 8 and 10 of the brake head walls 4 and 6, the walls may be formed with spring seats 48, 48, each of said seats having a spring-positioning lug 50 centrally formed thereon. A pair of springs 52, 52 may be seated against the seats 48, 48 on the outboard wall 6 and positioned thereon by the lugs 50, 50, the springs having their opposite ends seated as at 54, 54 against spring seats 56, 56 formed at the upper and lower ends, respectively, of the spring plate 58. Each seat 56 may have formed thereon a lug 60 affording positioning means for the associated spring 52.

Seated against the plate 58 as at 62 may be the annular washer 64, said plate and washer having aligned openings for the reception of the reduced end portion 66 of the trunnion 33. The plate 58 may have a slot 68 formed centrally therein receiving aligned elongated bosses 70 and 72 on the adjacent side of the washer 64 at opposite sides of the opening therein, each of said bosses having flat faces at 74, 74 which may engage stops 76, 76 and 78, 78 afforded by angularly arranged flat faces defining the margins of the slot 68 in the plate 58. The washer 64 is prevented from rotation on the trunnion end portion 66 and the device is maintained in assembled relationship by the provision of substantially parallel flanges 80, 80 on the washer projecting laterally therefrom toward the outboard extremity of the beam and having openings in alignment with an opening bored in the trunnion end portion 66, said openings receiving a bolt 82 extending therethrough and being held against accidental displacement by a lock washer 84 and nut 86 on the threaded end of said bolt.

It will be apparent that the rotation of the brake head on the beam will be restrained to permit the head to adjust itself to insure the application of the brake shoes carried thereby to the tread of the associated wheel by the friction developed between the bearing portion 8 of the inboard wall 4 of the head and the shoulder 32 of the beam and also by the engagement of the spring plate 58 and washer 64, the rotation of said head on the beam being limited in either direction on the beam by the engagement of the faces 74, 74 of the bosses 70 and 72 of the washer 64 with the faces 76, 76 or 78, 78 of the plate 58. It may be noted that this limiting arrangement described is advantageous, as in the event that the springs 52, 52 become broken in service, which sometimes occurs under the severe conditions to which a device of this type is subjected, the brake head is prevented from rotating to a point at which it may be knocked off the beam and thereby create the danger of derailment.

In the assembly of my novel arrangement, the springs 52, 52 and the spring plate 58 may be positioned against the outboard wall 6 of the head after the head and hanger are connected to the beam. The washer 64 is then placed on the beam with the bosses 70 and 72 in the slot 68 in the plate 58 and the springs 52, 52 are compressed sufficiently to permit the bolt 82 to be inserted in the aligned openings in the beam and in the flanges 80, 80 of the washer, whereupon the lock washer 84 and nut 86 may be positioned on the threaded end of the bolt.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a balancing and retaining device for an assembly including a pivoted member having a friction surface and an opening, and a pivot member received in said opening and having a shoulder engageable with said surface; the combination of a spring plate, a pair of springs compressed between the plate and the pivoted member for urging said surface against said shoulder, and means for equalizing the pressure of said springs against said pivoted member comprising pin means for pivotally connecting the plate to the pivot member on an axis angularly related to a plane defined by the compressional axes of said springs.

2. In a balancing and retaining device for a pivoted member having an opening receiving a pivot member, and having frictional engagement with the pivot member along surfaces angularly related to the pivotal axis of said pivoted member; the combination of a spring plate, a pair of springs compressed between the ends of the plate and the pivoted member, and means accommodating pivotal movement of the plate on said axis and on another axis extending transversely of the plate and for transmitting reaction of said springs to the pivot member.

3. In a balancing and retaining device for a pivoted member having an opening receiving a pivot member, and having frictional engagement with the pivot member along surfaces angularly related to the pivotal axis of said pivoted member; the combination of a spring plate, a friction member having frictional engagement with one side of the plate, pin means pivotally connecting the friction member to the pivot member for pivotal movement relative thereto on an axis extending transversely with respect to the pivot member, and springs above and below said last-mentioned axis respectively and compressed between the pivoted member and opposite ends of the plate at the other side thereof for urging said surfaces into engagement.

4. In a balancing and retaining device for a pivoted member having an opening receiving a pivot member, and having frictional engagement with the pivot member along surfaces angularly related to the pivotal axis of said pivoted member; the combination of a spring abutment, means for urging said surfaces into frictional engagement comprising a pair of springs compressed between the abutment and the pivoted member, and means for equalizing the reaction of said springs against said pivoted member comprising means for pivotally connecting the abutment to the pivot member and for limiting movement of the abutment away from said pivoted member along said axis.

5. In a balancing and retaining device for a pivoted member having an opening receiving a pivot member and having a surface engageable with a shoulder of the pivot member; the combination of a washer having an opening receiving the pivot member, a spring plate disposed between the washer and the pivoted member and having an opening receiving said pivot member, a pair of springs compressed between the plate and the pivoted member for urging said surface against said shoulder and for urging the plate into frictional engagement with the washer, and pin means pivotally connecting the washer to the pivot member for pivotal movement relative thereto on an axis approximately perpendicular to the longitudinal axis of the pivot member, the plane of the first-mentioned axis being approximately perpendicular to a plane bisecting the springs along their compressional axes, to equalize the pressure thereof against the pivoted member.

6. In a balancing and retaining device for a pivoted member having an opening receiving a pivot member and having a surface engageable with a shoulder of the pivot member; the combination of a washer loosely sleeved on the pivot member, a spring plate loosely sleeved on the pivot member between the washer and the pivoted member, a bolt pivotally connecting the washer to the pivot member for pivotal movement with respect thereto, and independent springs compressed between the plate and the pivoted member at opposite sides of said bolt for urging the surface against the shoulder and for urging the plate against the washer under pressure equalized by said bolt, said bolt interlocking the washer and pivot member against relative pivotal movement on the pivotal axis of said pivoted member.

7. A balancing and retaining device for a pivoted member having an opening receiving a pivot member, and having a friction surface engaged with a shoulder of said pivot member, said device comprising a spring abutment, springs compressed against the abutment and the pivoted member for urging the surface against said shoulder, and means connecting the abutment to said pivot member for preventing relative movement of the abutment away from the pivoted member axially of the pivot member and for accommodating rotational movement of the abutment on the axis of said pivot member and rotational movement of the abutment transversely of said axis to equalize the reaction of said springs against the pivoted member.

8. In a balancing and retaining device for a pivoted member having an opening receiving a pivot member, and having frictional engagement with the pivot member along surfaces angularly related to the pivotal axis of said pivoted member; the combination of a spring plate, springs compressed between the plate and the pivoted member at opposite sides of said axis, and means for transmitting the reaction of said springs against the plate to said pivot member and for accommodating rotative movement of the plate on said pivotal axis and on another axis disposed approximately perpendicular thereto and in a plane passing through said pivot member axially thereof and passing between said springs for equalizing the reaction thereof against the pivoted member.

WESLEY A. HELSTEN.

REFERENCES CITED

The following references are of record in the file of this patent:

UNITED STATES PATENTS

| Number | Name | Date |
|---|---|---|
| 1,604,351 | Hedgcock | Oct. 26, 1926 |
| 2,281,535 | Drews | Apr. 28, 1942 |

FOREIGN PATENTS

| Number | Country | Date |
|---|---|---|
| 273,064 | Great Britain | June 30, 1927 |